US006892078B2

(12) United States Patent
Sakaguchi et al.

(10) Patent No.: US 6,892,078 B2
(45) Date of Patent: May 10, 2005

(54) SIM CARD MOUNTING STRUCTURE OF MOBILE PHONE

(75) Inventors: Katsuya Sakaguchi, Tokyo (JP); Toyoshi Saito, Tokyo (JP)

(73) Assignee: NEC Corporation, Tokyo (JP)

( * ) Notice: Subject to any disclaimer, the term of this patent is extended or adjusted under 35 U.S.C. 154(b) by 509 days.

(21) Appl. No.: 10/040,095

(22) Filed: Dec. 31, 2001

(65) Prior Publication Data

US 2002/0094841 A1 Jul. 18, 2002

(30) Foreign Application Priority Data

Jan. 15, 2001 (JP) ........................................ 2001-006686

(51) Int. Cl.⁷ ................................................. H04B 1/38
(52) U.S. Cl. ................. 455/558; 455/575.1; 455/575.4; 455/575.8; 455/90.3; 379/433.09
(58) Field of Search ............................ 455/558, 575.1, 455/90.3, 575.4, 575.8, 571.1; 379/433.09, 433, 428, 58; 361/814, 801, 802

(56) References Cited

U.S. PATENT DOCUMENTS

| | | | | |
|---|---|---|---|---|
| 6,106,317 A | * | 8/2000 | Michaelis et al. | 439/326 |
| 6,226,189 B1 | * | 5/2001 | Haffenden et al. | 361/814 |
| 6,273,739 B1 | * | 8/2001 | Konno et al. | 439/331 |
| 6,319,036 B1 | * | 11/2001 | Zheng et al. | 439/326 |
| 6,397,081 B1 | * | 5/2002 | Franck et al. | 455/558 |

FOREIGN PATENT DOCUMENTS

CN 2307381 Y 2/1999

OTHER PUBLICATIONS

Copy of The People's Republic of China Office Action dated Jun. 27, 2003 (and English translation of relevant portion).

* cited by examiner

Primary Examiner—Erika A. Gary
Assistant Examiner—Wayne Cai
(74) Attorney, Agent, or Firm—Dickstein, Shapiro, Morin & Oshinsky, LLP.

(57) ABSTRACT

A SIM card mounting structure of a mobile phone includes a SIM card receiving recess 5 provided in a rear surface portion of a front side casing of the mobile phone for fittingly receiving a SIM card 1 therein, a pressing portion 3 formed of an elastic material and having one end integrally formed with the rear surface portion of the front side casing and the other end positioned over the SIM card receiving recess to elastically press the SIM card 1 and electrode terminals 2 for connecting electrodes of the SIM card 1 to a battery. The electrode terminals 2 are formed of an elastic material and arranged on a bottom of the recess 5 in an opposing relation to electrodes of the SIM card 1. The one end of the pressing portion is formed integrally on an end portion of the SIM card receiving recess 5 in a longitudinal direction of the mobile phone such that the pressing portion functions as a longitudinal leaf spring. The pressing portion 3 has a notch 4 for setting elasticity of the pressing portion appropriately and facilitating a handling operation of a SIM card.

12 Claims, 4 Drawing Sheets

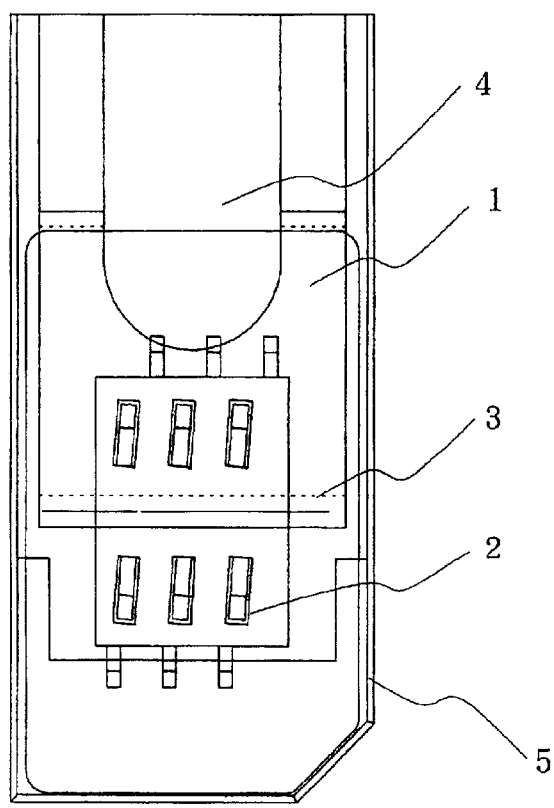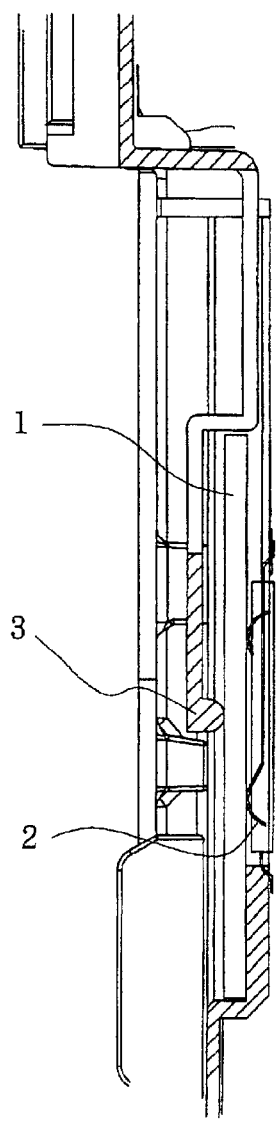
FIG.2a
FIG.2b

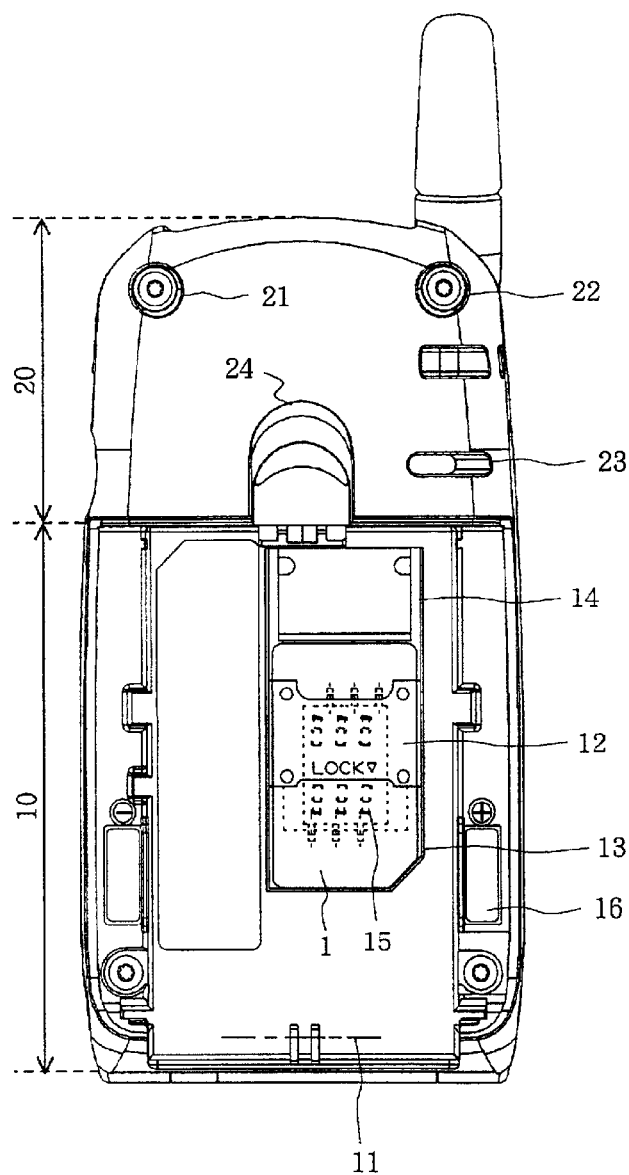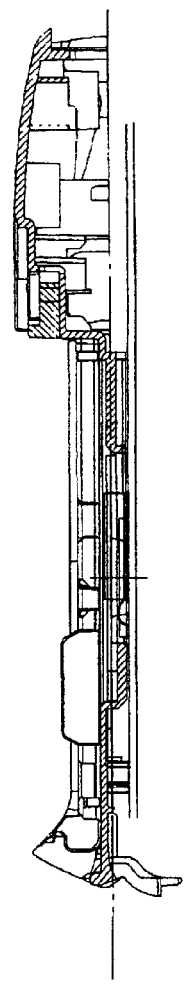
Prior Art
FIG.4a
Prior Art
FIG.4b

SIM CARD MOUNTING STRUCTURE OF MOBILE PHONE

BACKGROUND OF THE INVENTION

1. Field of the Invention

The present invention relates to a SIM card mounting structure of a mobile phone.

2. Description of Related Art

FIG. 4A and FIG. 4B are a plan view and a cross sectional side view of a conventional SIM card mounting structure, respectively. In FIG. 4A showing a rear surface of a front side casing of a mobile phone, one end portion of a back side casing (not shown) is rotatably supported by a rotary shaft 11 provided in one end portion of the front side casing so that the back side casing can be lain upon a SIM card mounting portion 10 of the SIM card mounting structure. When a telephone function of the mobile phone is used, the back side casing lain upon the SIM card mounting portion 10 is locked in its position by a locking member 24. The SIM card mounting structure shown in FIG. 4A is in a state where the back side casing is removed and a SIM card is exposed. The term "front side" used in this specification means a side of the SIM card mounting structure, on which character input buttons, etc., are arranged. A battery is housed in the back side casing, which is not shown.

A microphone housing portion 20 shown in an upper portion of FIG. 4A is screwed on the front side casing. A microphone is housed in the microphone housing portion 20. In FIG. 4A, reference numerals 21 and 22 in FIG. 4A depict screws for screwing the microphone housing portion to the front side casing and a reference numeral 23 depicts an opening for voice communication.

A recess 13 is provided in the SIM card mounting portion 10 and a SIM card 1 is received in the recess 13. The SIM card 1 is pressed down in the recess 13 by a metal lock member 12. The metal lock member 12 can slide in lateral directions in the drawing sheet. Further, a receiving portion 14 is provided in one end portion of the recess 13 of the SIM card mounting portion 10, for receiving the metal lock member 12. When the SIM card 1 is to be mounted, the metal lock member 12 is slid to the receiving portion 14 and then the SIM card is inserted in the recess 13. Thereafter, the metal lock member 12 is slid back from the receiving portion 14 onto the SIM card 1 to press down the latter. A contact terminal portion 15 to be in contact with an electrode terminal portion on the SIM card 1 is provided in a bottom of the recess 13 in an opposing relation to the electrode terminal portion of the SIM card 1. In FIG. 4A, a reference numeral 16 depicts electrodes connected to electrodes of the battery housed in the back side casing when the back side casing is mounted on the SIM card mounting portion 10. Incidentally, symbols + and − in the same figure indicate polarities of the battery.

As described above, the conventional SIM card mounting structure requires a mounting part such as the metal lock member 12 or an open/close type mounting holder, which is prepared as a separate piece. In such conventional SIM card mounting structure, however, there are problems of complication of the SIM card mounting structure, cost-up of the mobile phone due to provision of such separately provided part and necessity of providing a space for the separate part. Therefore, it is difficult to make the SIM card mounting structure inexpensive, lightweight and compact.

SUMMARY OF THE INVENTION

An object of the present invention is to provide a SIM card mounting structure, which does not use a specially dedicated part, is inexpensive, can easily confirm a mounting state of the SIM card therein and can be disassembled easily.

In order to achieve the above object, a SIM card mounting structure of a mobile phone having a front side casing and a back side casing, according to the present invention, comprises a SIM card receiving recess formed in a rear surface portion of the front side casing and adapted to fittingly receive a SIM card therein, a pressing portion formed of an elastic material for elastically pressing the SIM card received in the SIM card receiving recess, the pressing portion having one end portion formed integrally with an end portion of the rear surface portion of the front side casing by simultaneous molding and the other end portion extending over the SIM card receiving recess, and electrode terminals provided on a bottom of the SIM card receiving recess, the electrode terminals being formed of an electrically conductive, elastic material and positioned in an opposing relation to respective electrodes of the SIM card.

The pressing portion may be formed of a plastic material.

Further, it is preferable that the pressing portion has a notch portion for setting elasticity of the pressing portion appropriately and facilitating a handling of the SIM card.

In an embodiment of the present invention, the one end portion of the SIM card receiving recess, which is formed integrally with the one end portion of the pressing portion, is in an end portion in a longitudinal direction of the mobile phone such that the pressing portion functions as a longitudinal leaf spring.

In another embodiment of the present invention, the one end portion of the SIM card receiving recess, which is formed integrally with the one end portion of the pressing portion, is an edge portion of the SIM card mounting recess in a direction orthogonal to the longitudinal direction of the mobile phone such that the pressing portion functions as a lateral leaf spring.

The pressing portion may have an opening for confirming a mounting state of the SIM card. That is, a user can confirm the mounting state of the SIM card through the opening.

As mentioned, according to the present invention, it is possible to provide an inexpensive SIM card mounting structure of a mobile phone by forming a spring of a plastic material in a portion of a casing of the mobile phone without using a specially dedicated part. Further, a confirmation of a mounting state of the SIM card and a mounting operation of the SIM card can be facilitated by forming an opening or a notch in the spring structure.

BRIEF DESCRIPTION OF THE DRAWINGS

Specific embodiments of the present invention will now be described, by way of example only, with reference to the accompanying of drawings in which:

FIG. 2A is an enlarged plan view showing a main portion of the construction of the first embodiment shown in FIG. 1A;

FIG. 2B is a cross sectional side view of the main portion shown in FIG. 2A;

FIG. 4A is a plan view showing a construction of a conventional SIM card mounting structure; and FIG. 4B is a cross sectional side view of the conventional SIM card mounting structure.

DETAILED DESCRIPTION OF THE PREFERRED EMBODIMENTS

Figure 1A:
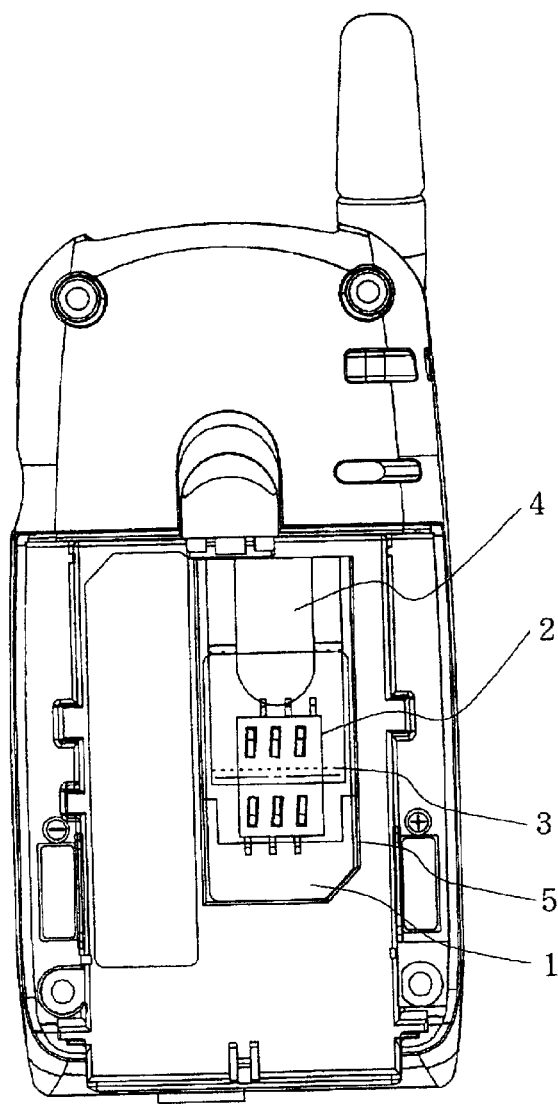
FIG. 1A is a plan view of a whole construction of a SIM card mounting structure of a mobile phone, according to a first embodiment of the present invention.
Figure 1B:
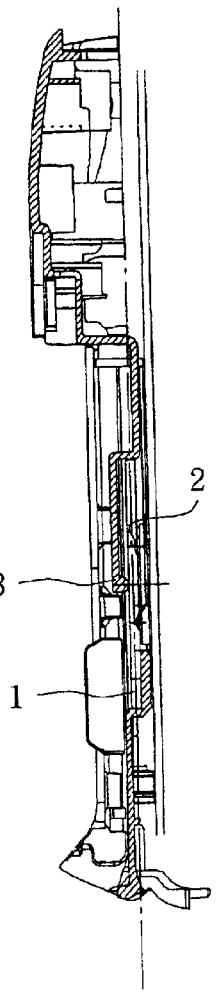
FIG. 1B is a cross sectional side view of the construction shown in FIG. 1A.

A SIM card mounting structure of a mobile phone, according to the present invention, is constructed such that a SIM card can be mounted and demounted easily by only a part formed integrally with a front side casing of the mobile phone without necessity of using a separately prepared SIM card mounting part such as the metal lock member 12 shown in FIG. 4A. FIG. 1A and FIG. 1B are a plan view and a cross sectional side view showing a whole construction of a SIM card mounting structure according to a first embodiment of the present invention, respectively, and FIG. 2A and FIG. 2B are an enlarged plan view and an enlarged cross sectional side view showing a main portion of the mobile phone shown in FIG. 1A and FIG. 1B, respectively. In these figures, parts, which are the same as those shown in FIG. 4A and FIG. 4B, are shown without using reference numerals.

Referring to FIG. 1A and FIG. 1B and FIG. 2A and FIG. 2B, a pressing portion 3 and a SIM card mounting portion 10 of the SIM card mounting structure according to the present invention are provided in the rear surface portion of the front side casing of the mobile phone. The SIM card mounting portion 10 includes a SIM card receiving recess 5 for receiving a SIM card 1 and the pressing portion 3 has one end integrally formed on the rear surface portion of the front side casing by simultaneous molding of an elastic material and the other end portion extending over the SIM card receiving recess portion 5 and elastically pressing down the SIM card 1 received in the SIM card receiving recess 5. Contact terminals 2 formed of an electrically conductive, elastic material, for connecting electrodes of the SIM card 1 to a battery housed in a back side casing of the mobile phone, are provided on a bottom of the SIM card receiving recess 5 in an opposing relation to the respective electrode of the SIM card 1.

In this embodiment, the one end of the pressing portion 3 is integrally formed with one portion of the SIM card receiving recess 5 in a longitudinal direction of the mobile phone and the other end portion of the pressing portion 3 extends such that the pressing portion 3 functions as a longitudinal leaf spring for elastically pressing the SIM card 1 received in the SIM card receiving recess 5. Further, the pressing portion 3 is formed of a plastic material and has a notch portion 4 for setting elasticity of the pressing portion 3 appropriately and facilitating a handling operation of the SIM card.

With using the pressing portion 3 in the form of the plastic leaf spring formed integrally with the front side casing and having the notch portion 4, the electrodes of the SIM card 1 are pressed to the respective contact terminals 2 with an appropriate pressure, when the SIM card 1 is received in the SIM card receiving recess 5. Further, the pressing portion 3 may be formed with a through-hole in a center portion of the pressing portion 3 or cut-away portion in one or both sides of the pressing portion for facilitating confirmation of the mounting state of the SIM card 1 therethrough. With such through-hole or cut-away portion, demounting of the SIM card 1 may be done by using a finger or the like. In this manner, according to the SIM card mounting structure of the present invention, an effect similar to that obtainable by the conventional SIM card mounting structure can be obtained without using any separately prepared part and the confirmation of the mounting state of the SIM card and the demounting of the SIM card can be performed easily.

Now, a second embodiment of the SIM card mounting structure of the present invention will be described with reference to FIG. 3A to FIG. 3C. The pressing portion of the SIM card-mounting structure according to the first embodiment is formed such that it functions as the longitudinal leaf spring for pressing the SIM card in the SIM card receiving recess. In the second embodiment, however, one end portion of a pressing portion is integrally formed on an end portion of a SIM card receiving recess of a front side casing of a mobile phone in a direction orthogonal to the longitudinal direction such that the pressing portion functions as a lateral leaf spring.

Figure 3A:
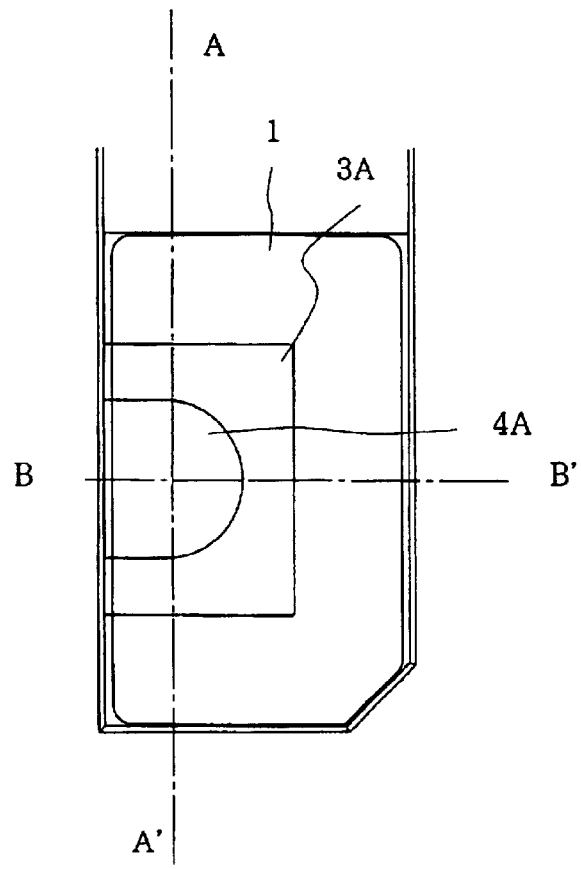
FIG. 3A is an enlarged plan view showing a main portion of a construction of a SIM card mounting structure of a mobile phone, according to a second embodiment of the present invention.
Figure 3B:
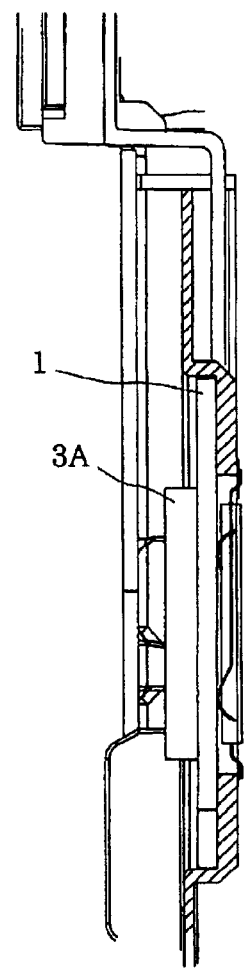
FIG. 3B is a cross section taken along a line A-A' in FIG. 3A.
Figure 3C:
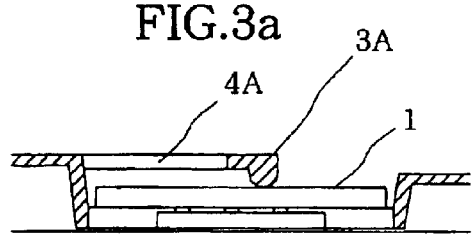
FIG. 3C is a cross section taken along a line B-B' in FIG. 3A.

In detail, FIG. 3A to FIG. 3C show a main portion of the SIM card mounting structure of the second embodiment in an enlarged scale, in which FIG. 3A is a plan view, FIG. 3B is a cross section taken along a line A–A' and FIG. 3C is a cross section taken along a line B–B' in FIG. 3A. In these figures, parts, which are the same as those shown in FIG. 2A and FIG. 2B, are shown without using reference numerals. The pressing portion 3A according to the second embodiment is integrally formed on the front side casing of the mobile phone as a plastic leaf spring. Elasticity of the pressing portion 3A in the form of the plastic leaf spring can be appropriately set by forming a hole and/or a notch 4A in the pressing portion 3A. The position of the SIM card 1 in the SIM card receiving recess can be confirmed without using any separately prepared part similarly to the case of the longitudinal leaf spring, by forming the hole and/or the notch 4A in the pressing portion 3A such that the end face of the SIM card can be confirmed through the hole and/or the notch 4A. The setting operation of the SIM card 1 in a predetermined position is also facilitated by the hole and/or the notch 4A.

As mentioned previously, in the conventional SIM card mounting structure shown in FIG. 4A and FIG. 4B in which the pressing portion is formed as a separate part and is slid after the SIM card is set to make the electrodes of the SIM card in pressure contact with the electrode terminals arranged in an opposing relation to the electrodes of the SIM card. In this conventional SIM card mounting structure in which the pressing portion has to be formed as the separate piece, the demounting of the SIM card requires a relatively difficult operation such as turning-over of the casing of the mobile phone or picking out the SIM card by inserting a finger nail into a space around the SIM card. According to the present invention, the SIM card is inserted into the pressing portion formed integrally with the casing of the mobile phone and the mounting state of the SIM card can be confirmed through the hole or the notch formed therein. As a result, the setting operation of the SIM card in a predetermined position of the mobile phone and the demounting operation of the SIM card from the predetermined position can be done easily by pushing the SIM card by a finger or the like through the hole or the notch.

What is claimed is:

1. A SIM card mounting structure of a mobile phone having a front side casing and a back side casing, comprising:

a SIM card receiving recess provided in a rear surface portion of said front side casing of said mobile phone for fittingly receiving a SIM card therein;

a pressing portion having one end integrally formed with said rear surface portion of said front side casing and the other end positioned over said SIM card receiving recess to elastically press said SIM card; and electrode terminals for connecting electrodes of said SIM card to a battery, said electrode terminals being formed of elastic material and arranged on a bottom of said SIM card receiving recess in an opposing relation to said electrodes of said SIM card.

2. A SIM card mounting structure as claimed in claim 1, wherein said pressing portion is formed of a plastic material.

3. A SIM card mounting structure as claimed in claim 2, wherein said pressing portion is formed with a notch for setting elasticity of said pressing portion appropriately and for facilitating a handling operation of said SIM card.

4. A SIM card mounting structure as claimed in claim 3, wherein said end of said pressing portion is integrally formed on an end portion of said recess in a longitudinal direction of said mobile phone such that said pressing portion functions as a longitudinal leaf spring.

5. A SIM card mounting structure as claimed in claim 3, wherein said one end of said pressing portion is integrally formed on an end portion of said recess in a lateral direction of said mobile phone such that said pressing portion functions as a lateral leaf spring.

6. A SIM card mounting structure as claimed in claim 2, wherein said pressing portion has an opening for confirming a mounting state of said SIM card.

7. A mobile phone having a SIM card mounting structure as claimed in claim 1.

8. A mobile phone having a SIM card mounting structure as claimed in claim 2.

9. A mobile phone having a SIM card mounting structure as claimed in claim 3.

10. A mobile phone having a SIM card mounting structure as claimed in claim 4.

11. A mobile phone having a SIM card mounting structure as claimed in claim 5.

12. A mobile phone having a SIM card mounting structure as claimed in claim 6.

* * * * *